United States Patent
Bikumala

(10) Patent No.: US 10,884,484 B2
(45) Date of Patent: Jan. 5, 2021

(54) EXTENDING A BATTERY LIFE OF A BATTERY-POWERED COMPUTING DEVICE

(71) Applicant: Dell Products L. P., Round Rock, TX (US)

(72) Inventor: Sathish Kumar Bikumala, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 127 days.

(21) Appl. No.: 16/227,100

(22) Filed: Dec. 20, 2018

(65) Prior Publication Data

US 2020/0201419 A1 Jun. 25, 2020

(51) Int. Cl.

| | | |
|---|---|---|
| *G06F 1/3287* | (2019.01) | |
| *G06F 1/3212* | (2019.01) | |
| *G06F 1/329* | (2019.01) | |
| *G06N 20/00* | (2019.01) | |

(52) U.S. Cl.
CPC ............ *G06F 1/3287* (2013.01); *G06F 1/329* (2013.01); *G06F 1/3212* (2013.01); *G06N 20/00* (2019.01)

(58) Field of Classification Search
CPC ...... G06F 1/3287; G06F 1/3212; G06F 1/329; G06N 20/00
See application file for complete search history.

(56) References Cited

U.S. PATENT DOCUMENTS

| | | | | |
|---|---|---|---|---|
| 6,457,132 | B1 * | 9/2002 | Borgendale | G06F 1/3203 713/320 |
| 7,430,675 | B2 * | 9/2008 | Lee | G06F 1/3203 713/320 |
| 8,655,307 | B1 * | 2/2014 | Walker | H04W 68/005 455/405 |
| 8,762,756 | B1 * | 6/2014 | Moy | G06F 1/3287 713/321 |
| 9,496,736 | B1 * | 11/2016 | Johansson | H02J 7/342 |
| 9,557,792 | B1 * | 1/2017 | Potlapally | G06F 1/3206 |
| 9,829,962 | B2 * | 11/2017 | Kaushal | G06F 1/28 |
| 10,168,684 | B2 * | 1/2019 | Boss | G05B 19/0428 |
| 10,397,743 | B2 * | 8/2019 | Wong | H04W 4/80 |
| 2003/0005341 | A1 * | 1/2003 | Terunuma | G06F 1/28 713/310 |
| 2003/0009705 | A1 * | 1/2003 | Thelander | G06F 1/3203 713/340 |
| 2006/0019723 | A1 * | 1/2006 | Vorenkamp | H04W 52/0258 455/574 |

(Continued)

*Primary Examiner* — Aurel Prifti
(74) *Attorney, Agent, or Firm* — Campbell Stephenson LLP

(57) ABSTRACT

In some examples, in a battery-powered computing device, a software monitor may access a calendar, determine that an event is occurring, determine that the event has an associated profile, and configure the computing device based on the profile to reduce a power consumption of the computing device. For example, one or more hardware components and one or more software components identified in the profile may be placed in a low power consumption state. For example, a hardware component may be transitioned from a power-on state to a low-power state power or may not be provided power. As another example, execution of a software component may be stopped or an execution priority of the software component may be modified from a first priority to a second priority that is lower than the first priority.

20 Claims, 6 Drawing Sheets

(56) References Cited

U.S. PATENT DOCUMENTS

| | | | |
|---|---|---|---|
| 2006/0156045 A1* | 7/2006 | Galles | G06F 1/3296 713/300 |
| 2007/0049133 A1* | 3/2007 | Conroy | G06F 1/3296 439/894 |
| 2008/0005599 A1* | 1/2008 | Theocharous | G06F 1/3203 713/300 |
| 2008/0178029 A1* | 7/2008 | McGrane | G06F 1/3287 713/324 |
| 2009/0265568 A1* | 10/2009 | Jackson | G06F 1/3203 713/320 |
| 2011/0046805 A1* | 2/2011 | Bedros | H04L 12/2809 700/291 |
| 2011/0072292 A1* | 3/2011 | Khawand | G06F 1/3203 713/340 |
| 2011/0213997 A1* | 9/2011 | Kansal | G06F 1/3234 713/324 |
| 2012/0315845 A1* | 12/2012 | Buczek | H04M 1/72572 455/41.1 |
| 2013/0151877 A1* | 6/2013 | Kadri | G06F 1/3275 713/320 |
| 2013/0227318 A1* | 8/2013 | Musial | H04W 52/0258 713/320 |
| 2014/0095091 A1* | 4/2014 | Moore | H02J 7/0047 702/63 |
| 2014/0120961 A1* | 5/2014 | Buck | H04W 4/12 455/466 |
| 2014/0180488 A1* | 6/2014 | Hirayama | H04L 12/283 700/295 |
| 2015/0019889 A1* | 1/2015 | Banerjee | G06F 9/5088 713/320 |
| 2015/0144434 A1* | 5/2015 | Herkel | B66B 1/302 187/276 |
| 2015/0323974 A1* | 11/2015 | Shuster | G06F 1/329 713/320 |
| 2016/0073351 A1* | 3/2016 | Cardozo | G06F 1/3212 455/574 |
| 2016/0179173 A1* | 6/2016 | Eastep | G06F 1/3234 713/320 |
| 2016/0231801 A1* | 8/2016 | Chandra | G06F 1/3212 |
| 2016/0242119 A1* | 8/2016 | Shedletsky | H04W 52/0264 |
| 2016/0262108 A1* | 9/2016 | Weast | G06F 1/3287 |
| 2017/0083383 A1* | 3/2017 | Rider | G06F 9/5094 |
| 2017/0308151 A1* | 10/2017 | Zhang | G06F 1/3284 |
| 2017/0353039 A1* | 12/2017 | Sunyi | G06F 1/266 |
| 2018/0006967 A1* | 1/2018 | Dotan-Cohen | H04L 47/821 |
| 2018/0267839 A1* | 9/2018 | Maisuria | G06F 9/5094 |
| 2018/0348844 A1* | 12/2018 | Lingutla | G06F 1/3231 |
| 2019/0236199 A1* | 8/2019 | Mahalingam | G06F 16/2358 |
| 2019/0305597 A1* | 10/2019 | Venkatraman | H02J 50/80 |
| 2020/0120428 A1* | 4/2020 | Gehring | H04R 25/554 |

\* cited by examiner

EXTENDING A BATTERY LIFE OF A BATTERY-POWERED COMPUTING DEVICE

BACKGROUND OF THE INVENTION

Field of the Invention

This invention relates generally to computing devices that include a battery (e.g., smartphones, tablets, laptops, and the like), and more particularly to extending a battery life of the computing devices based on a predicted usage of each of the computing devices.

Description of the Related Art

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A battery-powered computing device, such as, for example, a laptop, a tablet, or a smartphone may run an operating system that provides a limited set of ways to conserve power and extend battery life, such as reducing a brightness of a display device of the computing device. However, such a crude mechanism does not take into account the various activities a user may perform using the computing device. For example, different activities may use different components of the computing device.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a battery-powered computing device may include a software monitor. The software monitor may access a calendar application executing on the computing device, determine that a first event is scheduled at a current time, determine that the first event has an associated first profile, and automatically (e.g., without human interaction) configure the computing device based on the first profile to reduce a power consumption of the computing device, thereby extending a battery life of a battery that is powering the computing device. Configuring the computing device based on the first profile may include placing in a low power state one or more hardware components identified in the profile and placing in the low power state one or more software components identified in the profile. For example, a hardware component may not be provided power or may be transitioned from a power-on state to a low-power state (e.g., standby). As another example, execution of a software component may be stopped or an execution priority of software component may be modified from a first priority to a second priority (e.g., a background process priority) that is lower than the first priority. The software monitor may determine that a second event is scheduled after the first event and determine that the second event does not have an associated second profile. After the first event has ended, the software monitor may gather hardware usage data identifying a first set of the one or more hardware components that are active and a remainder of the one or more hardware components that are inactive. The software monitor may gather software usage data identifying a second set of the one or more software components that are active and a remainder of the one or more software components that are inactive. The software monitor may automatically (e.g., without human interaction) create the second profile associated with the second event based on the hardware usage data and the software usage data. The software monitor may configure the components of the computing device based on the second profile. For example, the software monitor may place in the low power state the remainder of the one or more hardware components and place in the low power state the remainder of the one or more software components. The software monitor may determine that no event is scheduled after the first event and, after the first event has ended, determine that the computing device is being used to perform an activity. The software monitor may gather hardware usage data identifying a first set of the one or more hardware components that are active and a remainder of the one or more hardware components that are inactive, gather software usage data identifying a second set of the one or more software components that are active and a remainder of the one or more software components that are inactive, automatically create a new profile, and associate the new profile with the activity. The software monitor may determine, from a calendar application, a plurality of activities scheduled in a particular time period (e.g., during a day) comprising at least eight hours, determine a current battery level of the battery that is powering the computing device, and determine a predicted battery life of the battery in the particular time period based on: (i) a power consumption associated with each activity of the plurality of activities and (ii) the current battery level of the battery. The software monitor may display the predicted battery life. The software monitor may determine, based on the plurality of activities, a location where the battery can be charged during the particular time period and add a note, using the calendar application, to a particular event that occurs at the location. The note may provide an indication to a user of the computing device to charge the computing device at the location.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
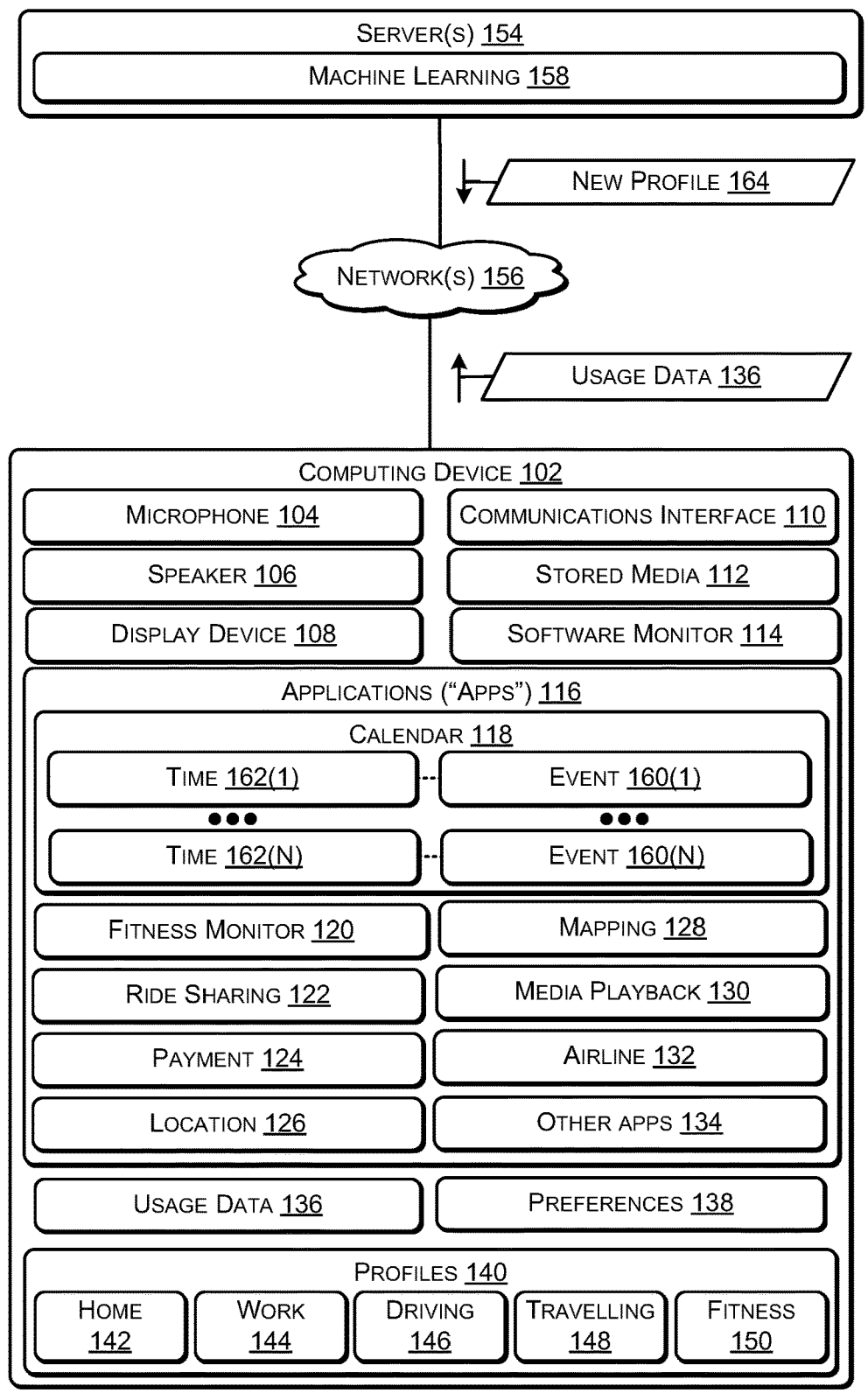
FIG. 1 is a block diagram of a system that includes a computing device having power usage profiles, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable artificial intelligence (e.g., machine learning) to predict an activity in which a user is currently engaged and automatically (e.g., without human interaction) select or create a profile to reduce power consumption and thereby extend battery life. For example, a computing device, such as a laptop, a tablet, a smartphone, or a smartwatch, may include a battery. When the user engages in an activity that uses the computing device, a software monitor application on the computing device may monitor the way in which the computing device is being used and automatically (e.g., without human interaction) select an existing profile (or create a new profile) to reduce power consumption and extend battery life. For example, the software monitor application may determine which software components, such as applications (e.g., mapping application, media playback application, and the like) and other software components (e.g., drivers, libraries, tools, and the like) are being used based on computing resource usage, e.g., by determining which software components are using more than a threshold amount (e.g., 2%, 5%, 10%, or the like) of (i) a central processing unit (CPU), (ii) a memory, (iii) a storage drive, (iv) a network (e.g., Bluetooth®, Wi-Fi®, cellular, or the like), (v) a graphics processing unit (GPU), (vi) another computing resource, or any combination thereof. The software monitor application may determine which hardware components (e.g., microphone, speaker, display device, communications interface, and the like) are being used based on (i) monitoring power consumption by monitoring those hardware components that use more than a threshold amount of power (e.g., X millivolts (mV) and/or Y milliamperes (mA), where X>0, Y>0), (ii) by monitoring a system bus to determine which hardware components are active (e.g., sending, receiving, or both) on the bus, or both (i) and (ii). Based on determining which of the software components and the hardware components are being used, the software monitor application may automatically (e.g., without human interaction) create and store a profile (e.g., an activity profile) for the activity in which the software components and the hardware components that are being used are active while the software components and the hardware components that are not being used are placed in a low power state. For example, placing a software component in a low power state may include shutting down a process, not starting a process, assigning a relatively low priority (e.g., a low scheduling priority, such as background priority) to a process, or the like. Placing a hardware component in a low power state may include not providing power or providing a relatively small amount of power (e.g., standby mode) to the hardware component, e.g., transition the hardware component from a power-on state to a low power state.

In some cases, the computing device may come with one or more preset activity profiles (e.g., factory created profiles) that are associated with common activities. For example, a driving profile may be provided in which a mapping application of the computing device provides audible and/or visual driving directions. A fitness profile may be provided in which a media playback application plays back or streams audio to enable the user to listen to music or other media while exercising. For example, the fitness profile may activate: (i) a media playback or media streaming application and (ii) a speaker, a headphone jack, or Bluetooth® for wireless headphones. If the media streaming application is active, a communications interface may be activated to enable media to be streamed over a network (e.g., using Wi-Fi® or cellular technology). The user may be provided with the capability to customize the factory profiles (e.g., preset activity profiles) and to create new profiles. Thus, the software monitor application may automatically create a profile, the computing device may come from the factory with preset activity profiles, and the user may modify an existing profile or create a new profile.

The software monitor application may access a calendar application and determine if the user has a particular activity (e.g., go to the gym, listen to music at work, drive to meet someone, watch streaming videos at home, or the like) scheduled at the current time. If an activity is currently scheduled, the software monitor application may determine if an associated profile is available. If an associated profile is available, then the software monitor application may automatically select the associated profile and configure the software components and the hardware components based on the associated profile. For example, if the calendar indicates that the user has blocked out an hour in which to work out (e.g., go to the gym, go for a jog, etc.), and a fitness profile is available, then the software monitor application may automatically select the fitness profile and configure the software components and the hardware components based on the fitness profile. Configuring the software components and the hardware components based on the profile may include placing software and hardware components that are used in the activity in an active mode and placing software and hardware components that are not used in the activity in a low power state.

If no activity is currently scheduled in the calendar, then the software monitor application may determine if the user is using the computing device. For example, if the display device is in a power saver mode (e.g., blank or displaying a screen saver), if power consumption is less than a predetermined threshold, or if the computing device is not receiving input data from an input device (e.g., touchscreen, keyboard, mouse, microphone, or the like), then the software monitor application may determine that the computing device is not in use. If the display device is on (e.g., not dimmed, not blank, and not displaying a screen saver), if power consumption is greater than or equal to the predetermined threshold, or if the computing device is receiving input data from an input device (e.g., touchscreen, keyboard, mouse, microphone, or the like), then the software monitor application may determine that the computing device is being used. If the computing device is not being used, then the software monitor application may monitor the calendar and usage of the software components the hardware components to determine when the user is engaged in an activity that uses the computing device.

If the software monitor application determines that the computing device is being used, then the software monitor application may monitor the activities that the user is performing using the computing device. If a previously created profile matches the current activities, then the software monitor application may automatically select and use the previously created profile to reduce power consumption. In some cases, the software monitor application may use a machine learning algorithm, such as for example, Bayesian machine learning. Bayes machine learning determines the probability of the user performing a particular activity using the computing device occurring based on the probability of one or more events that have occurred. Thus, using Bayes and based on the monitoring, the software monitor application may predict what activity the computing device is being used to perform and then determine if a previously created profile can be applied. For example, if the user has (i) opened a mapping application and (ii) requested driving directions to a location, then the software monitor application may predict that the user is planning to drive to the location and automatically select the driving activity profile. As another example, the software monitor application may determine, based on the monitoring, that the computing device has linked to a vehicle using a wireless technology, such as Bluetooth®, predict that the user is in the vehicle and is planning to drive somewhere and automatically select the driving activity profile. As yet another example, the software monitor application may determine, based on the monitoring, that a media playback application has been selected to playback or stream media content, predict that that the user is planning to exercise, and automatically select a fitness activity profile. After automatically selecting a particular activity profile, the software monitor application may configure (e.g., activate or put in a low-power mode) particular software components and hardware components based on the selected profile to reduce battery consumption and extend battery life.

The software monitor application may use real-time data as well as historical data and user preferences to predict which activity the computing device is currently engaged in performing. For example, the real-time data may include which software components are being used, which hardware components are being used, which software components are not being used, and which hardware components are not being used. The historical data may include particular locations that the user frequently visits (e.g., more than a threshold number of times in a particular time interval), e.g., based on usage data stored by the mapping application. The historical data may include particular musical artists that the user prefers to listen to when engaged in fitness activities, e.g., based on usage data stored by the media playback application. For example, if the user always listens to a particular set of musical artists when engaged in fitness activities, when the user opens the media playback application and selects a musical artist from the particular set of musical artists, then the software monitor application may predict that the user is engaging in a fitness activity, automatically select the fitness activity profile, and configure the software components and the hardware components accordingly.

If none of the previously created profiles are a match, then the software monitor application may automatically (e.g., without human interaction) create a new profile based on the information gathered from monitoring the software components and the hardware components. For example, the software monitor application may determine which software components are being used, which hardware components are being used, which software components are not being used, and which hardware components are not being used. Based on this information, the software monitor application may automatically create a profile in which (i) the software components that are used are started, (ii) the hardware components that are used are provided with power, and (iii) the software components and the hardware components that are not being used are placed in a low power state. The software monitor application may create a name for the profile that the user can modify (e.g., if the user desires). The software monitor application may automatically select the new profile and configure the software components and the hardware components to reduce power consumption to extend battery life.

When a user starts using the computing device at the beginning of the day (e.g., after the computing device powers up, after the computing device loads an operating system, after the computing device detects input from a user, or the like) the software monitor application may access the calendar application and review the user's activities during the day. Using the preset activity profiles, the user created profiles, and the activity profiles created by the computing device, the software monitor application may predict an amount of power consumption of the user's activities during that day. The software monitor application may provide the predicted battery life for the day to the user to enable the user to plan accordingly. In some cases, the software monitor application may suggest when the user should charge the computing device to enable the user to complete the scheduled activities for that day. For example, the software monitor application may suggest that the user charge the computing device at a particular time period when the user will be in a vehicle, at a particular time period when the user will be at work, or the like.

Thus, a software monitor application may determine a current usage of a computing device based on (i) accessing a scheduling application to determine if an activity is currently scheduled and (ii) monitoring a usage of components (e.g., software components and hardware components) of the computing device. The software monitor application may use machine learning (e.g., Bayes) to predict, based on the current usage, the activity for which the computing device is being used. The software monitor application may determine if there is a previously created profile for the activity. If a previously created profile exists, the software monitor application may automatically select the profile and configure the components accordingly. For example, configuring the components according to the profile may include activating a first set of components of the computing device, deactivating (e.g., placing in a low power consumption mode) a second set of components of the computing device, or both. If a previously created profile does not exist for the current activity, the software monitor application may automatically create a new profile based on the data collected from monitoring the usage of the components. The profiles may be designed to deactivate unused components to reduce power consumption and thereby extend battery life. For example, unused hardware components may be powered-off or placed in a standby or low power consumption mode while unused software components may be shut down or given a low execution priority (e.g., background process priority). The software monitor application may continually or periodically (e.g., at a predetermined time interval, such as every 10 minutes, every 30 minutes, every hour, or the like) monitor the current usage (i) based on the schedule in the calendar application and (ii) based on the component usage and automatically select (or create) an appropriate activity profile.

As an example, a computing device may include one or more processors and one or more non-transitory computer readable media storing instructions that are executable by the one or more processors to perform various operations. For example, the operations may include accessing a calendar application executing on the computing device, determining that a first event is scheduled at a current time, determining that the first event has an associated first profile, and configuring the computing device based on the first profile to reduce a power consumption of the computing device, thereby extending a battery life of a battery that is powering the computing device. Configuring the computing device based on the first profile may include placing in a low power state one or more hardware components identified in the profile and placing in the low power state one or more software components identified in the profile. Placing in the low power state the one or more hardware components identified in the profile may include either stopping power from being provided to at least one hardware component of the one or more hardware components or transitioning at least one hardware component from a power-on state to a low-power state (e.g., standby). Placing in the low power state the one or more software components identified in the profile may include either stopping execution of at least one software component of the one or more software components or modifying an execution priority of the at least one software component from a first priority to a second priority (e.g., a background process priority) that is lower than the first priority. The operations may include determining that a second event is scheduled after the first event and determining that the second event does not have an associated second profile. After the first event has ended, the operations may include gathering hardware usage data identifying a first set of the one or more hardware components that are active and a remainder of the one or more hardware components that are inactive, gathering software usage data identifying a second set of the one or more software components that are active and a remainder of the one or more software components that are inactive, and creating the associated second profile. The operations may include configuring the components of the computing device based on the second profile. The configuring may include: placing in the low power state the remainder of the one or more hardware components and placing in the low power state the remainder of the one or more software components. The operations may include determining that no event is scheduled after the first event. After the first even has ended, the operations may include determining that the computing device is being used to perform an activity, gathering hardware usage data identifying a first set of the one or more hardware components that are active and a remainder of the one or more hardware components that are inactive, gathering software usage data identifying a second set of the one or more software components that are active and a remainder of the one or more software components that are inactive, creating a new profile, and associating the new profile with the activity. The operations may include determining, from a calendar application, a plurality of activities scheduled in a particular time period (e.g., during the day) comprising at least eight hours, determining a current battery level of the battery that is powering the computing device, and determining a predicted battery life of the battery in the particular time period based on: a power consumption associated with each activity of the plurality of activities and the current battery level of the battery. The operations may include displaying the predicted battery life. The operations may include determining, based on the plurality of activities, a location where the battery can be charged during the particular time period and adding a note, using the calendar application, to a particular event that occurs at the location. The note may provide an indication to a user of the computing device to charge the computing device at the location.

FIG. 1 is a block diagram of a system 100 that includes a computing device having power usage profiles, according to some embodiments. The computing device 102 may be a battery powered device, such as, for example, a smartwatch, a smartphone, a tablet, a laptop, or the like.

The computing device 102 may include various hardware components, such as, for example, a microphone 104, a speaker 106, a display device 108, and a communications interface 110. The communications interface 110 may enable the computing device 102 to use one or more types of wireless communications, such as, for example, Bluetooth®, WiFi®, cellular (e.g., global system for mobile (GSM) of code division multiple access (CDMA)) or the like to communicate with other computing devices, such as a server 154, via one or more networks 156. Of course, these are merely examples and the computing device 102 may include additional hardware components.

The computing device 102 may include stored media 112, such as audio files, video files, electronic books, or the like that can be played back using the computing device 102.

The computing device 102 may include various software components, such as, for example, a software monitor 114 may monitor various components of the computing device 102. In some cases, the software monitor 114 may include a machine learning algorithm to predict a current activity that the computing device 102 is being used to perform. For example, the machine learning algorithm may use Bayes, support vector machine, random forest, or the like. The software components may include one or more applications ("apps") 116, such as a calendar app 116, a fitness monitor app 120 (e.g., to determine how many steps the user is walking how many calories the user is burning, and the like), a ride sharing app 122 (e.g., to obtain a ride), a payment app 124 (e.g., to electronically make payments), a location app 126 (e.g., to determine a current location of the computing device 102 using global positioning satellites (GPS) or another location technology), a mapping app 128 (e.g., to provide driving directions and the like), a media playback 130 (e.g., to playback the stored media 112 and to stream media over the network 156), an airline app 132 (e.g., to display boarding passes, determine and display flight schedules, and the like), and other apps 134 (e.g., shopping apps, and the like).

The computing device 102 may store usage data 128 gathered by the software monitor 114. The usage data 136 identifies components (e.g., hardware components and software components) of the computing device 102 that are being used, which components not being used, how each of the components are being used, and the like. The computing device 102 may store user preferences 138 that identify various user preferences, such as preferred app to use for payment, preferred app to use for mapping, preferred app to use for media playback, and the like.

The computing device 102 may store one or more activity profiles 140, such as, for example, a home profile 142, a work profile 144, a driving profile 146, a travelling profile 148, and a fitness profile 150. For example, the home profile 142 may set components of the computing device 102, such as the media playback app 130, the speaker 106, and the display device 108, to stream video content (e.g., Netflix®, Hulu®, or the like). The work profile 144 may set components of the computing device 102, such as the media playback app 130 and the speaker 106, to stream audio content (e.g., Spotify® or the like). The driving profile 142 may set components of the computing device 102, such as the speaker 106, the display device 108, the location app 126, and the mapping app 128, to provide visual and audio driving directions. The travelling profile 148 may set components of the computing device 102, such as the display device 108, airline app 132, and the media playback app 130, to enable the user to display a boarding pass and to read an eBook. The fitness profile 142 may set components of the computing device 102, such as the media playback app 130 and the fitness monitor 120, to stream audio content (e.g., Spotify®, or the like) and to measure the user's activities. One or more of the profiles 140 may be factory provided profiles. One or more of the profiles 140 may be created by a user of the computing device 102. One or more of the profiles 140 may be automatically created by the software monitor 114.

The calendar application 118 may include information about events 160(1) to 160(N) (where N>0) that are scheduled and when they are scheduled. For example, each of the events 160 may have corresponding time information 162 that indicates when the event starts, when the event ends, how long the event will be, and the like. For example, the events 160 may include gym from 7:00 AM to 8:00 AM, work from 8:30 AM to 12:00 noon, lunch with a first client at a first location from 12:30 to 1:30 PM, meeting with a second client at a second location from 1:45 to 2:45 PM, work from 3:00 PM to 5:30 PM, and home after 5:30 PM.

In some cases, the software monitor 114 may not include machine learning to create an activity profile. In such cases, a machine learning algorithm 158 hosted by the servers 154 may provide a service that creates a new profile 164 based on the usage data 136 associated with a computing device, such as the representative computing device 102. In such cases, the software monitor 114 may monitor a usage of the components of the computing device 102 to create the usage data 136. The software monitor may send the usage data 136 to the server 154. The machine learning algorithm 158 may analyze the usage data 136 and create and send the new profile 164. The software monitor 114 may receive the new profile 160 from the servers 154 and store the new profile 160 as one of the profiles 140.

When the user engages in an activity that uses the computing device 102, the software monitor 114 may monitor the way in which the computing device 102 is being used and automatically select one of the profiles 140 (or automatically create a new profile) to reduce power consumption and extend battery life. For example, the software monitor 114 may determine which software components, such as the apps 116 and other software components (e.g., drivers, libraries, tools, and the like) are being used based on computing resource usage, e.g., by determining which software components are using more than a threshold amount (e.g., 2%, 5%, 10%, or the like) of (i) a central processing unit (CPU), (ii) a memory, (iii) a storage drive, (iv) a network (e.g., Bluetooth®, Wi-Fi®, cellular, or the like), (v) a graphics processing unit (GPU), (vi) another computing resource, or any combination thereof. The software monitor 114 may determine which hardware components (e.g., the microphone 104, the speaker 106, the display device 108, the communications interface 110, and the like) are being used based on (i) monitoring those hardware components that use more than a threshold amount of power (e.g., X millivolts (mV) and/or Y milliamperes (mA), where X>0, Y>0), (ii) by monitoring a system bus to determine which hardware components are active (e.g., sending, receiving, or both) on the bus, or both (i) and (ii). Based on determining which of the software components and the hardware components are being used, the software monitor 114 may automatically create and store (in the profiles 140) a new activity profile for the activity in which the software components and the hardware components that are being used are active while the software components and the hardware components that are not being used are placed in a low power state. For example, placing a software component in a low power state may include shutting down a process, not starting a process, assigning a relatively low priority (e.g., a low scheduling priority, such as background priority) to a process, or the like. Placing a hardware component in a low power state may include not providing power or providing a relatively small amount of power (e.g., standby mode) to the hardware component.

The software monitor 114 may access the calendar application 118 and determine if the user has a particular event 160 (e.g., go to the gym, listen to music at work, drive to meet someone, watch streaming videos at home, or the like) scheduled at the current time. If an event 160 is currently scheduled, the software monitor 114 may determine if an associated profile for the event 160 is available in the profiles 140. If the profiles 140 includes an associated profile, then the software monitor 114 may automatically select the associated profile (e.g., the fitness profile 150) and configure the software components and the hardware components of the computing device 102 based on the associated profile. For example, if the calendar app 118 indicates that the user has a fitness activity listed as a current event of the events 160, and the fitness profile 150 is in the profiles 140, then the software monitor 114 may automatically select the fitness profile 150 and configure the software components and the hardware components of the computing device 102 based on the fitness profile 150. Configuring the software components and the hardware components based on one of the profiles 140 may include placing software and hardware components that are used in the activity in an active mode and placing software and hardware components that are not used in the activity in a low power state.

If no event 160 is currently scheduled in the calendar 118, then the software monitor 114 may determine if the user is using the computing device 102. For example, if the display device 108 is in a power saver mode (e.g., blank or displaying a screen saver), if power consumption of the computing device 102 is less than a predetermined threshold, or if the computing device 102 is not receiving input data from an input device (e.g., touchscreen, keyboard, mouse, microphone, or the like), then the software monitor 114 may determine that the computing device 102 is not in use. If the computing device 102 is not being used, then the software monitor 114 may monitor the calendar 118, usage of the software components, and usage of the hardware components to determine when the user is engaged in an activity that uses the computing device 102. If the display device 108 is on (e.g., not dimmed, not blank, and not displaying a screen saver), if power consumption of the computing device 102 is greater than or equal to a predetermined threshold, or if the computing device 102 is receiving input data from an input device (e.g., touchscreen, keyboard, mouse, microphone, or the like), then the software monitor 114 may determine that the computing device 102 is being used.

If the software monitor 114 determines that the computing device 102 is being used, then the software monitor 114 may monitor the components that are being used and determine a current activity associated with the computing device 102. If a previously created one of the profiles 140 matches the current activity, then the software monitor 114 may automatically select and use the previously created profile to reduce power consumption. In some cases, the software monitor 114 may use a machine learning algorithm, such as for example, Bayes machine learning. B ayes machine learning determines the probability of the user performing a particular activity using the computing device occurring based on the probability of one or more events that have occurred. Thus, using Bayes and based on the monitoring (e.g., the usage data 136), the software monitor 114 may predict what activity the computing device 102 is being used to perform and then determine if a previously created profile of the profiles 140 can be applied. For example, if the user has (i) opened the mapping app 128 and (ii) requested driving directions to a location, then the software monitor 114 may predict that the user is planning to drive to the location and automatically select the driving profile 146. As another example, the software monitor 114 may determine, based on the usage data 136, that the communications interface 110 has linked to a vehicle using Bluetooth®, predict that the user is in the vehicle and is planning to drive somewhere, and automatically select the driving profile 146. As yet another example, the software monitor 114 may determine, based on the usage data 136, that the media playback app 130 has been selected to playback or stream media content, predict that that the user is planning to exercise, and automatically select the fitness profile 150. After selecting a particular one of the profiles 140, the software monitor 114 may configure (e.g., activate or put in a low-power mode) particular software components and particular hardware components based on the selected profile to reduce battery consumption and extend battery life.

The software monitor 114 may use the usage data 136 that includes historical data and real-time data in addition to the user preferences 138 to predict which activity the computing device 102 is currently engaged in performing. For example, the usage data 136 may include which software components are being used in a particular time interval (e.g., last Z minutes, where Z>0, such as Z=1, 5, 10, 20, 30 or the like), which hardware components are being used in the particular time interval, which software components are not being used in the particular time interval, and which hardware components are not being used. The usage data 136 may include particular locations that the user frequently visits (e.g., more than a threshold number of times in a particular time interval, such as more than three times in a month, three months, six months, or the like), e.g., based on data stored by the mapping app 128. The usage data 136 may include particular musical artists that the user prefers to listen to when engaged in fitness activities, e.g., based on data stored by the media playback app 130. For example, assume the user listens to a particular set of musical artists when engaged in fitness activities. When the user opens the media playback app 130 and selects a musical artist from the particular set of musical artists, the software monitor 114 may predict that the user is engaging in a fitness activity, automatically select the fitness profile 150, and configure the software components and the hardware components of the computing device 102 accordingly. For example, the Bluetooth® of the communications interface 110 may be enabled to allow the user to use Bluetooth headphones to listen to the music.

If none of the previously created profiles are a match, then the software monitor 114 may automatically create a new profile based on the usage data 136 gathered from monitoring the software components and the hardware components of the computing device 102. For example, the software monitor 114 may determine which software components are being used, which hardware components are being used, which software components are not being used, and which hardware components are not being used. Based on this information (e.g., in the usage data 136), the software monitor 114 may automatically create a profile in which (i) the software components that are used are started, (ii) the hardware components that are used are provided with power, and (iii) the software components and the hardware components that are not being used are placed in a low power state. The software monitor 114 may create a name for the profile that the user can modify (e.g., if the user desires). The software monitor 114 may automatically select the new profile and configure the software components and the hardware components to reduce power consumption and extend battery life.

When a user starts using the computing device 102 at the beginning of the day (e.g., after the computing device 102 powers up, after the computing device 102 loads an operating system, after the computing device 102 detects input from a user, or the like) the software monitor 114 may access the calendar app 118 and review the events 160 scheduled in the times 162 occurring in the current day. Using the profiles 140 (e.g., including preset activity profiles, user created profiles, and activity profiles created by the software monitor 114), the software monitor 114 may predict an amount of power consumption of the user's activities during that day. The software monitor 114 may provide (e.g., display on the display device 108) the predicted battery life for the day to enable the user to plan accordingly. In some cases, the software monitor 114 may suggest when the user could charge the computing device 102 to enable the user to complete the events 160 that are scheduled for the current day. For example, the software monitor 114 may suggest that the user charge the computing device 102 at a particular time period 162 when the user will be in a vehicle, at a particular time period 162 when the user will be at work, or the like.

Thus, a software monitor 114 may determine a current usage of the computing device 102 based on (i) accessing the calendar app 118 to determine if an event is currently scheduled and (ii) monitoring a usage of components (e.g., software components and hardware components) of the computing device 102. The software monitor 114 may use machine learning (e.g., Bayes) to predict, based on the usage data 136, the activity for which the computing device is being used. The software monitor 114 may determine if there is a profile corresponding to the activity in the profiles 140. If a corresponding profile exists in the profiles 140, the software monitor 114 may automatically select the corresponding profile and configure the components accordingly. For example, configuring the components according one of the profiles 140 may include activating a first set of components of the computing device 102, deactivating (e.g., placing in a low power consumption mode) a second set of components of the computing device 102, or both. If corresponding profile does not exist for the current activity, the software monitor 114 may automatically create a new profile based on the usage data 136 collected from monitoring the usage of the components. Each of the profiles 140 may be designed to deactivate unused components of the computing device 102 to reduce power consumption and thereby extend battery life. For example, unused hardware components may be powered-off or placed in a standby or low power consumption mode while unused software components may be shut down or given a low execution priority (e.g., background process priority). The software monitor 114 may continually or periodically (e.g., at a predetermined time interval, such as every 10 minutes, every 30 minutes, every hour, or the like) monitor and determine a current activity (i) based on the schedule in the calendar app 118 and (ii) based on the usage data 136. When the software monitor 114 detects that a change has occurred, e.g., detects that the computing device 102 went from performing from a first activity to performing a second activity, the software monitor 114 may automatically select (or create) an appropriate activity profile (e.g., one of the profiles 140).

Figure 2:
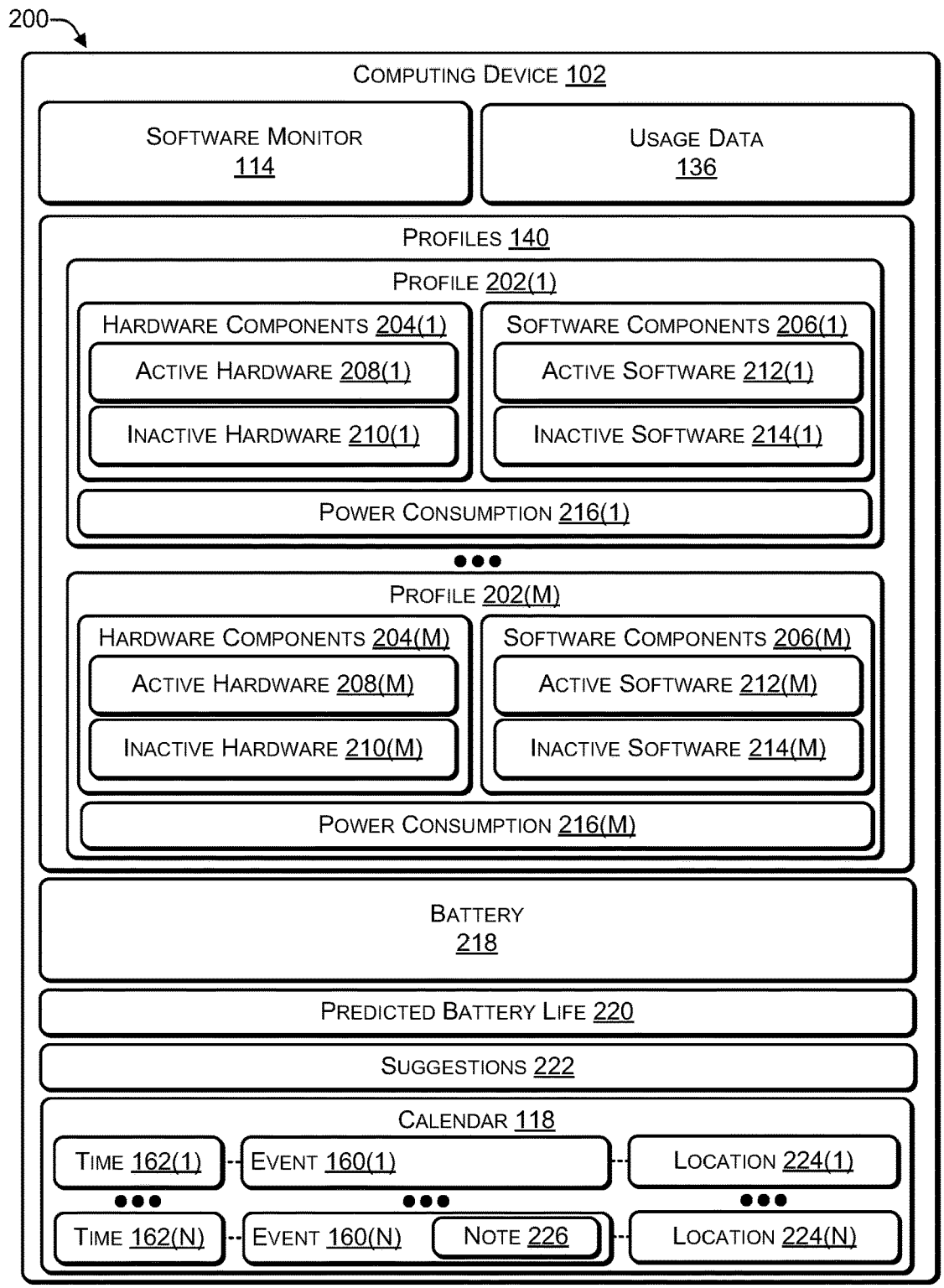
FIG. 2 is a block diagram of a system that includes multiple power usage profiles, according to some embodiments.

FIG. 2 is a block diagram of a system 200 that includes multiple power usage profiles, according to some embodiments. The profiles 140 may include one or more profiles, such as a profile 202(1) to a profile 202(M) (where M>0), such as, for example, the profiles 142, 144, 146, 148, and 150 of FIG. 1. Each of the profiles 202 may include information about which components are active and which components are inactive (e.g., in a low-power mode). For example, the profile 202(1) may identify hardware components 204(1) and identify software components 206(1). The hardware components 204(1) may identify active hardware components 208(1) and inactive hardware components 210(1). The software components 206(1) may identify active software components 212(1) and inactive software components 214(1). The profile 202(M) may identify hardware components 204(M) and identify software components 206(M). The hardware components 204(M) may identify active hardware components 208(M) and inactive hardware components 210(M). The software components 206(M) may identify active software components 212(M) and inactive software components 214(M).

The software monitor 114 may determine the usage data 136. Based on the usage data 136, the software monitor 114 may automatically select a profile, such as the profile 202(M), and configure the components of the computing device 102 accordingly. For example, the software monitor 114 may determine whether (e.g., verify that) the particular components identified in the active hardware components 208(M) are active, e.g., receiving power and in a powered-on state. The software monitor 114 may cause any of the particular components that are determined to be currently inactive to become active. The software monitor 114 may determine whether (e.g., verify that) particular components identified in the inactive hardware components 210(M) are currently inactive, e.g., the components are in a low-power state (e.g., powered-off state or in a standby state). The software monitor 114 may cause any of the particular components that are determined to be currently active to become inactive.

The software monitor 114 may determine whether (e.g., verify that) the particular components identified in the active software components 212(M) are active, e.g., currently executing. The software monitor 114 may cause any of the components that are determined to be inactive to become active by opening (e.g., instantiating or initiating execution of) the currently inactive software components. The software monitor 114 may determine whether (e.g., verify that) the particular components identified in the inactive software components 214(M) are inactive, e.g., the software components are not executing or have been assigned a low execution priority (e.g., background process). For example, when engaged in a fitness activity, an application to receive phone calls may remain active as a background process, in case someone calls the user. The software monitor 114 may cause any of the particular components that are determined to be active to become inactive by stopping execution of the particular components or by modifying an execution priority of the particular components from a relatively high priority to a lower priority.

After the software monitor 114 has selected and configured components of the computing device 102 according to one of the profiles 202, such as the profile 202(M), the software monitor 114 may monitor a power consumption 216 of a battery 218 during a predetermined time interval (e.g., P minutes, such as 1, 2, 5, 10, or 30 minutes) and associate the power consumption 216 with the selected one of the profiles 202, such as the profile 202(M). For example, applying the profile 202(1) may result in the associated power consumption 216(1) and applying the profile 202(M) may result in the associated power consumption 216(M).

When a user starts using the computing device 102 at the beginning of the day (e.g., after the computing device 102 powers up, after the computing device 102 loads an operating system, after the computing device 102 detects input from a user, or the like) the software monitor 114 may access the calendar app 118 and review the events 160 scheduled in the times 162 occurring in the current day. Using the power consumption 216 associated with each of the profiles 140, the software monitor 114 may predict an amount of power consumption of the user's activities during that day. The software monitor 114 may provide (e.g., display on the display device 108) a predicted battery life 220 for the day to enable the user to plan accordingly. In some cases, the software monitor 114 may provide suggestions 222 when the user may charge the computing device 102 to enable the user to complete the events 160 that are scheduled for the current day. For example, the user may provide the software monitor 114 information about locations frequently visited by the user where charging is available, such as home, work, and the user's vehicle. The suggestions 222 may include suggesting that the user charge the computing device 102 at a particular time period 162 when the user will be in a vehicle, at a particular time period 162 when the user will be at work or at home, or at another location where the user has indicated that charging is available.

One or more of the events 160 may have an associated location 224 where the associated event occurs. To illustrate, the event 160(1) may have an associated location 224(1) and the event 160(N) may have an associated location 224(N). For example, an event of the events 160 that occurs at home may have the address of the user's home. An event of the events 160 that occurs at work may have the address of the user's work. A lunch event or a dinner event of the events 160 may have the address of a restaurant. An event of the events 160 that occurs at a gym may have the address of the gym. The user may indicate which of the most frequently visited locations provide access to a charging facility to charge the battery 218. Based on the events 160 (e.g., activities), the software monitor 114 may determine a location where the battery can be charged during a particular time period (e.g., during the day, which may be defined by the user as a time period of 8 hours, 12 hours, 24 hours, or the like). The software monitor 114 may add a note 226, using the calendar app 118, to a particular event, such as the event 160(N), that occurs at a location where the computing device 102 can be charged. The note 226 may provide an indication to the user to charge the computing device at the location. For example, the note 226 may include text ("please charge"), an icon (e.g., illustrating an electrical plug and having a color such as yellow or red), another type of indicator, or any combination thereof.

Figure 3:
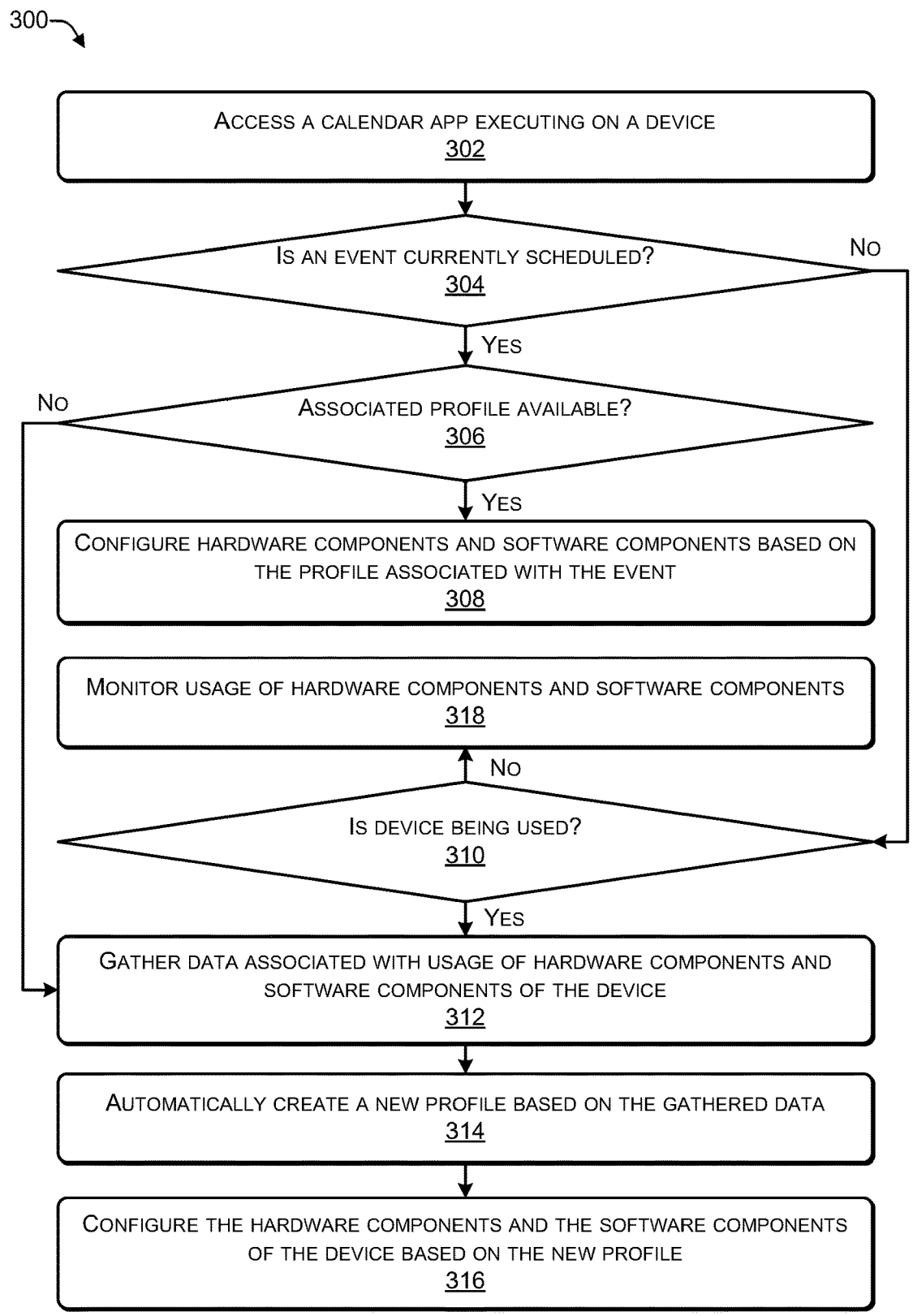
FIG. 3 is a flowchart of a process that includes gathering data associated a usage of hardware components and software components of a device, according to some embodiments.
Figure 4:
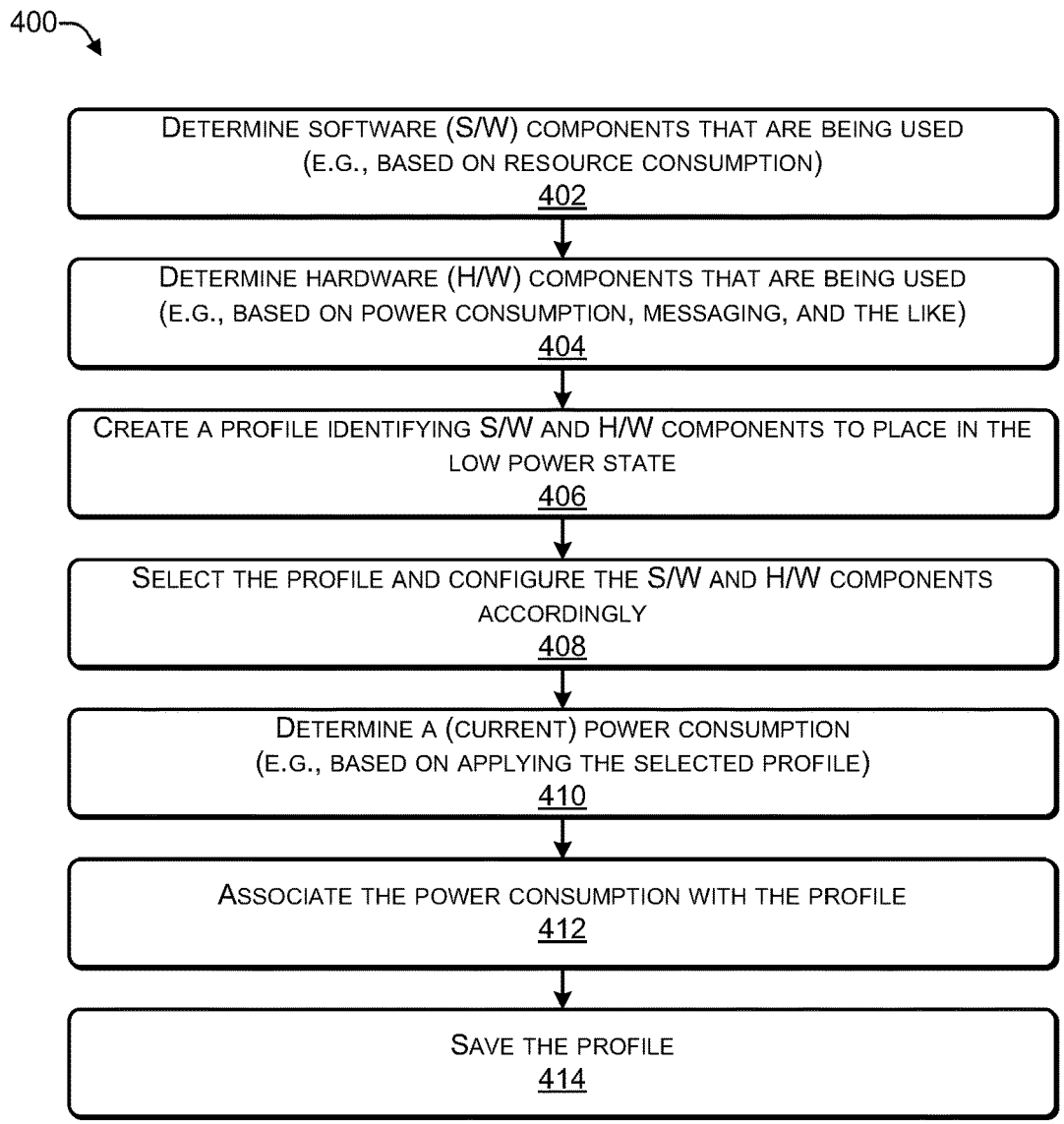
FIG. 4 is a flowchart of a process that includes creating a profile identifying software components and hardware components to place in a low power state, according to some embodiments.
Figure 5:
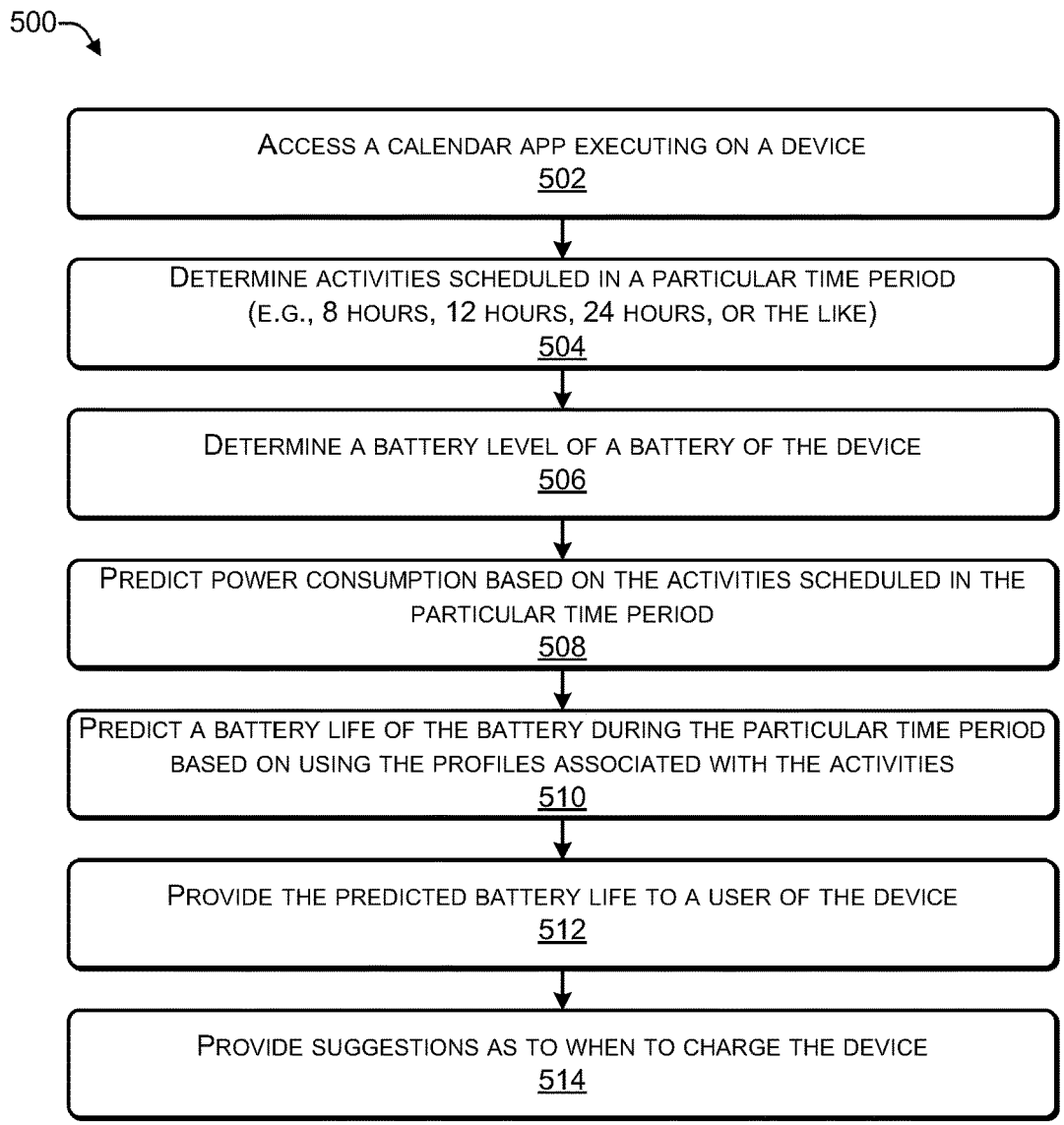
FIG. 5 is a flowchart of a process that includes predicting power consumption based on activities scheduled in a particular time period, according to some embodiments.

In the flow diagram of FIGS. 3, 4, and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, and 500, are described with reference to FIG. 1 and FIG. 2, as described above, although other models, frameworks, systems and environments may be used to implement these processes.

FIG. 3 is a flowchart of a process 300 that includes gathering data associated a usage of hardware components and software components of a device, according to some embodiments. For example, the process 300 may be performed by the software monitor 114 of FIG. 1 and FIG. 2.

At 302, a calendar app executing on a device may be accessed. At 304, a determination may be made whether an event is currently scheduled. If a determination is made, at 304, that "yes" an event is currently scheduled, then the process may proceed to 306. At 306, a determination may be made whether a profile associated with the event is available. If a determination is made, at 306, that "yes" a profile associated with the event is available, then, at 308, the hardware components and the software components of the device may be configured based on the profile associated with the event. If a determination is made, at 306, that "no" an associated profile is not available, then the process proceeds to 312. For example, in FIG. 1, the software monitor 114 may access the calendar application 118 and determine if the user has a particular event 160 currently scheduled. If a particular event of the events 160 is currently scheduled, the software monitor 114 may determine if a profile associated with the particular event is available in the profiles 140. If the profiles 140 include an associated profile, then the software monitor 114 may automatically select the associated profile and configure the software components and the hardware components of the computing device 102 based on the associated profile. Configuring the software components and the hardware components based on one of the profiles 140 may include placing software and hardware components that are used in the activity in an active mode and placing software and hardware components that are not used in the activity in a low power state.

If a determination is made, at 304, that "no" an event is not currently scheduled in the calendar app, then the process may proceed to 310. At 310, a determination may be made whether the device is being used. If a determination is made, at 310, that ("no") the device is not being used, then process may proceed to 318 where the usage of hardware components and software components of the device may be monitored. For example, in FIG. 1, if an event is not currently scheduled in the calendar 118, then the software monitor 114 may determine if the user is using the computing device 102. For example, the software monitor 114 may determine that the computing device 102 is not in use: (i) if the display device 108 is in a power saver mode (e.g., blank or displaying a screen saver), (ii) if power consumption of the computing device 102 is less than a predetermined threshold, (iii) if the computing device 102 is not receiving input data from an input device (e.g., touchscreen, keyboard, mouse, microphone, or the like), or any combination thereof. If the computing device 102 is not being used, then the software monitor 114 may gather the usage data 136 by monitoring the calendar 118, usage of the software components, and usage of the hardware components to determine when the user is engaged in an activity that uses the computing device 102. If the display device 108 is on (e.g., not dimmed, not blank, and not displaying a screen saver), if power consumption of the computing device 102 is greater than or equal to a predetermined threshold, or if the computing device 102 is receiving input data from an input device (e.g., touchscreen, keyboard, mouse, microphone, or the like), then the software monitor 114 may determine that the computing device 102 is being used.

If a determination is made, at 310, that "yes" the device is being used, then the process proceeds to 312. At 312, the process may gather data associated with a usage of hardware components and software components of the device. At 314, the process may automatically create a new profile based on the gathered data. At 316, the process may configure the hardware components and the software components of the device based on the new profile. For example, in FIG. 1, the software monitor 114 may automatically create a new profile based on the usage data 136 gathered from monitoring the software components and the hardware components of the computing device 102. For example, the software monitor 114 may determine which software components are being used, which hardware components are being used, which software components are not being used, and which hardware components are not being used. Based on this information (e.g., in the usage data 136), the software monitor 114 may automatically create a profile in which (i) the software components that are used are started, (ii) the hardware components that are used are provided with power, and (iii) the software components and the hardware components that are not being used are placed in a low power state. The software monitor 114 may create a name for the profile that the user can modify (e.g., if the user desires). The software monitor 114 may automatically select the new profile and configure the software components and the hardware components to reduce power consumption and extend battery life.

FIG. 4 is a flowchart of a process 400 that includes creating a profile identifying software components and hardware components to place in a low power state, according to some embodiments. For example, the process 400 may be performed by the software monitor 114 of FIG. 1 and FIG. 2.

At 402, the process may determine software components that are being used. At 404, the process may determine hardware components that are being used. For example, in FIG. 1, the software monitor 114 may monitor the components of the computing device 102 over a predetermined amount of time (e.g., T seconds, T>0, such as T=10, 20, 30 or the like) to determine which software components are being used, which software components are not being used, which hardware components are being used, and which hardware components are not being used. The process may store the data gathered through the monitoring in the usage data 136.

At 406, the process may automatically create a profile identifying software and hardware components to place in a low power state. For example, in FIG. 2, the software monitor 114 may automatically create one of the profiles 140 identifying which software components are to be active, which software components are to be inactive (e.g., placed in a low power state), which hardware components are to be active, and which hardware components are to be inactive (e.g., placed in a low power state) after each of the profiles 140 is applied (e.g., after the computing device 102 is configured according to each of the profiles 140).

At 408, the process may automatically select the (newly created) profile and configure the software components and the hardware components accordingly. At 410, the process may determine a current power consumption of the device (e.g., based on applying the selected profile). At 412, the power consumption may be associated with the profile. At 414, the process may save the profile. For example, in FIG. 2, the software monitor 114 may automatically create, select, and apply the profile 202(M), activating the hardware identified in the active hardware 208(M) and the software identified in the active software 212(M), while placing in a first low power state, the hardware identified in the inactive hardware 210(M) and placing in a second low power state, the software identified in the inactive software 214(M). After applying the profile 202(M), the software monitor 114 may measure, over a predetermined time interval, the power consumption 216(M) of the battery 218, associate the power consumption 216(M) with the profile 202(M), and store the profile 202(M) in the profiles 140.

FIG. 5 is a flowchart of a process 500 that includes predicting power consumption based on activities scheduled in a particular time period, according to some embodiments. For example, the process 500 may be performed by the software monitor 114 of FIG. 1 and FIG. 2.

At 502, the process may access a calendar app executing on a device. At 504, the process may determine activities scheduled in a particular time period. For example, in FIG. 1, at the beginning of a day (e.g., after the computing device 102 powers up, after the computing device 102 loads an operating system, after the computing device 102 detects input from a user, or the like), the software monitor 114 may access the calendar app 118 and determine the events 160 scheduled in the times 162 that occur in the current day.

At 506, the process may determine a battery level of a battery of the device. At 508, the process may predict a power consumption of the device based on the activities scheduled in the particular time period. At 510, the process may predict a battery life of the battery during the particular time period based on using the profiles associated with the activities. At 512, the process may provide (e.g., display) the predicted battery life to a user of the device. For example, in FIG. 2, the software monitor 114 may determine a current battery level of the battery 218. The software monitor 114 may, based on the events 160 scheduled in the 162 that occur in the day, determine which corresponding ones of the profiles 140 apply, and predict a power consumption of the computing device 102 based on the power consumption 216 associated with the corresponding profiles 140. If a particular event of the events 160 scheduled during the day does not have an associated one of the profiles 140, the software monitor 114 may predict a battery consumption for the particular event based on an average power consumption of the battery 218 (e.g., by the computing device 102) when one of the profiles 140 is not being used.

At 514, the process may provide suggestions as to when to charge the device. For example, in FIG. 2, the software monitor 114 may provide the suggestions 222 that indicate when the user may charge the computing device 102 to enable the user to complete the events 160 that are scheduled for the current day. For example, the user may provide the software monitor 114 information about locations frequently visited by the user where charging is available, such as home, work, and the user's vehicle. The suggestions 222 may include suggesting that the user charge the computing device 102 at a particular time period 162 when the user will be in a vehicle, at a particular time period 162 when the user will be at work or at home, or at another location where the user has indicated that charging is available. Based on the events 160 (e.g., activities), the software monitor 114 may determine a location where the battery can be charged during a particular time period (e.g., during the day, which may be defined by the user as a time period of 8 hours, 12 hours, 24 hours, or the like). The software monitor 114 may add a note 226, using the calendar app 118, to a particular event, such as the event 160(N), that occurs at a location where the computing device 102 can be charged. The note 226 may provide an indication to the user to charge the computing device at the location. For example, the note 226 may include text ("please charge"), an icon (e.g., illustrating an electrical plug and having a color such as yellow or red), another type of indicator, or any combination thereof.

Figure 6:
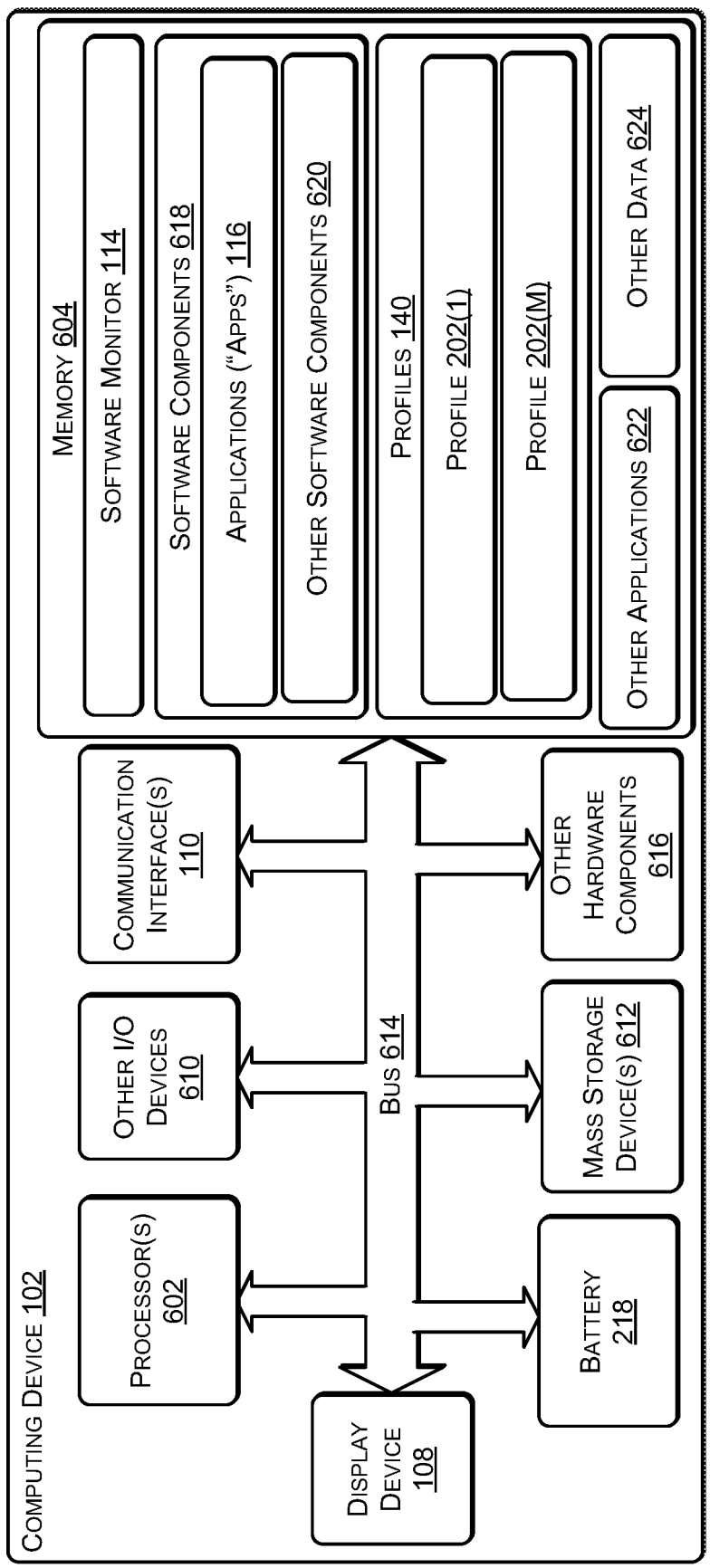
FIG. 6 illustrates an example configuration of a computing device that can be used to implement the systems and techniques described herein.

FIG. 6 illustrates an example configuration of the computing device 102 that can be used to implement the systems and techniques described herein. The computing device 102 may include one or more processors 602 (e.g., CPU, GPU, or the like), a memory 604, communication interfaces 110, the display device 108, other input/output (I/O) devices 610 (e.g., keyboard, trackball, and the like), and one or more mass storage devices 612 (e.g., disk drive, solid state disk drive, or the like), and other hardware components 616, configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 602 are one or more hardware devices that may include a single processing unit or a number of processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The computing device 600 may include one or more communication interfaces 606 for exchanging data via a network (e.g., the network 156 of FIG. 1). The communication interfaces 110 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 110 can also provide communication with external storage, such as a storage array, network attached storage, storage area network, cloud storage, or the like.

The display device 108 may be used for displaying content (e.g., information and images) to users. Other I/O devices 610 may be devices that receive various inputs from a user and provide various outputs to the user, and may include a keyboard, a touchpad, a mouse, a printer, audio input/output devices (e.g., the microphone 104, the speaker 106, of FIG. 1), and so forth.

The computer storage media, such as memory 116 and mass storage devices 612, may be used to store software and data. For example, the computer storage media may be used to store the software monitor 114, information about software components 618, including the apps 116 and other software components 620 (e.g., device drivers, and "helper" processes that assist the apps 116, and the like). The computer storage media may be used to store the profiles 118, other applications 622 and other data 624.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    accessing, by one or more processors of a computing device, a calendar application executing on the computing device;
    determining, by the one or more processors, that a first event is currently scheduled;
    determining, by the one or more processors, that the first event has an associated first profile;
    configuring, by the one or more processors, the computing device based on the associated first profile to reduce a power consumption of the computing device to extend a battery life of a battery that is powering the computing device, the configuring comprising:
        placing in a low power hardware state one or more hardware components identified in the associated first profile; and
        placing in a low power software state one or more software components identified in the associated first profile;
    determining, using a calendar application and by the one or more processors, a plurality of activities scheduled in a particular time period comprising at least eight hours;

determining, by the one or more processors, a current
  battery level of the battery that is powering the computing device;
determining, by the one or more processors, a predicted
  battery life of the battery in the particular time period
  based on:
  a power consumption associated with each activity of
    the plurality of activities; and
  the current battery level of the battery; and
displaying, by the one or more processors, the predicted
  battery life.

2. The method of claim 1, wherein placing in the low power hardware state the one or more hardware components identified in the associated first profile comprises one of:
  stopping power from being provided to at least one hardware component of the one or more hardware components; or
  transitioning the at least one hardware component from a power-on state to a low-power state.

3. The method of claim 1, wherein placing in the low power software state the one or more software components identified in the associated first profile comprises one of:
  stopping execution of at least one software component of the one or more software components;
  modifying an execution priority of the at least one software component from a first priority to second priority that is lower than the first priority.

4. The method of claim 1, further comprising:
determining that a second event is scheduled after the first event;
determining that the second event does not have an associated second profile;
after the first event has ended:
  gathering hardware usage data identifying a first set of the one or more hardware components that are active and a remainder of the one or more hardware components that are inactive;
  gathering software usage data identifying a second set of the one or more software components that are active and a remainder of the one or more software components that are inactive;
  creating the associated second profile; and
  configuring the computing device based on the associated second profile, the configuring comprising:
    placing in the low power hardware state the remainder of the one or more hardware components; and
    placing in the low power software state the remainder of the one or more software components.

5. The method of claim 1, further comprising:
determining that no event is scheduled after the first event; and
after determining that the first event has ended:
  determining that the computing device is being used to perform an activity;
  gathering hardware usage data identifying a first set of the one or more hardware components that are active and a remainder of the one or more hardware components that are inactive;
  gathering software usage data identifying a second set of the one or more software components that are active and a remainder of the one or more software components that are inactive;
  creating a new profile; and
  associating the new profile with the activity.

6. The method of claim 1, wherein the associated first profile comprises one of:
  a home profile;
  a work profile;
  a driving profile;
  a travelling profile; or
  a fitness profile.

7. The method of claim 1, further comprising:
determining, based on the plurality of activities, a location where the battery can be charged during the particular time period; and
adding a note, using the calendar application, into a particular event that occurs at the location, the note indicating to charge the computing device at the location.

8. A computing device comprising:
one or more processors; and
one or more non-transitory computer readable media storing instructions executable by the one or more processors to perform operations comprising:
  accessing a calendar application executing on the computing device;
  determining that a first event is scheduled at a current time;
  determining that the first event has an associated first profile;
  configuring the computing device based on the associated first profile to reduce a power consumption of the computing device to extend a battery life of a battery that is powering the computing device, the configuring comprising:
    placing in a low power hardware state one or more hardware components identified in the associated first profile; and
    placing in a low power software state one or more software components identified in the associated first profile;
  determining that a second event is scheduled after the first event;
  determining that the second event does not have an associated second profile; and
  after determining that the first event has ended:
    gathering hardware usage data identifying a first set of the one or more hardware components that are active and a remainder of the one or more hardware components that are inactive;
    gathering software usage data identifying a second set of the one or more software components that are active and a remainder of the one or more software components that are inactive;
    creating the associated second profile; and
    configuring the computing device based on the associated second profile, the configuring comprising:
      placing in the low power hardware state the remainder of the one or more hardware components; and
      placing in the low power software state the remainder of the one or more software components.

9. The computing device of claim 8, wherein placing in the low power hardware state the one or more hardware components identified in the associated first profile comprises one of:
  stopping power from being provided to at least one hardware component of the one or more hardware components; or
  transitioning the at least one hardware component from a power-on state to a low-power state.

10. The computing device of claim 8, wherein placing in the low power software state the one or more software components identified in the associated first profile comprises one of:
   stopping execution of at least one software component of the one or more software components; or
   modifying an execution priority of the at least one software component from a first priority to a second priority that is lower than the first priority.

11. The computing device of claim 8, wherein the associated first profile comprises one of:
   a home profile associated with a home activity performed at a home location;
   a work profile associated with a work activity performed at a work location;
   a driving profile associated with an activity performed in a vehicle;
   a travelling profile associated with a travel-based activity; or
   a fitness profile associated with a fitness-related activity.

12. The computing device of claim 8, the operations further comprising:
   determining that no event is scheduled after the second event; and
   after the second event has ended:
      determining that the computing device is being used to perform an activity;
      gathering hardware usage data identifying a first set of the one or more hardware components that are active and a remainder of the one or more hardware components that are inactive;
      gathering software usage data identifying a second set of the one or more software components that are active and a remainder of the one or more software components that are inactive;
      creating a new profile; and
      associating the new profile with the activity.

13. The computing device of claim 8, the operations further comprising:
   determining, from a calendar application, a plurality of activities scheduled in a particular time period comprising at least eight hours;
   determining a current battery level of the battery that is powering the computing device;
   determining a predicted battery life of the battery in the particular time period based on:
      a power consumption associated with each activity of the plurality of activities; and
      the current battery level of the battery;
   displaying the predicted battery life;
   determining, based on the plurality of activities, a location where the battery can be charged during the particular time period; and
   adding a note, using the calendar application, into a particular event that occurs at the location, the note indicating to charge the computing device at the location.

14. One or more non-transitory computer readable media storing instructions executable by one or more processors of a computing device to perform operations comprising:
   accessing a calendar application executing on the computing device;
   determining that a first event is scheduled at a current time;
   determining that the first event has an associated first profile;
   configuring the computing device based on the associated first profile to reduce a power consumption of the computing device to extend a battery life of a battery that is powering the computing device, the configuring comprising:
      placing in a low power hardware state one or more hardware components identified in the associated first profile; and
      placing in a low power software state one or more software components identified in the associated first profile;
   determining, from a calendar application, a plurality of activities scheduled in a particular time period comprising at least eight hours;
   determining a current battery level of the battery that is powering the computing device;
   determining a predicted battery life of the battery in the particular time period based on:
      a power consumption associated with each activity of the plurality of activities; and
      the current battery level of the battery; and
   displaying the predicted battery life.

15. The one or more non-transitory computer readable media of claim 14, wherein placing in the low power hardware state the one or more hardware components identified in the associated first profile comprises one of:
   stopping power from being provided to at least one hardware component of the one or more hardware components; or
   transitioning the at least one hardware component from a power-on state to a low-power state.

16. The one or more non-transitory computer readable media of claim 14, wherein placing in the low power software state the one or more software components identified in the associated first profile comprises one of:
   stopping execution of at least one software component of the one or more software components; or
   modifying an execution priority of the at least one software component from a first priority to a second priority that is lower than the first priority.

17. The one or more non-transitory computer readable media of claim 14, the operations further comprising:
   determining that a second event is scheduled after the first event;
   determining that the second event does not have an associated second profile;
   after the first event has completed:
      gathering hardware usage data identifying a first set of the one or more hardware components that are active and a remainder of the one or more hardware components that are inactive;
      gathering software usage data identifying a second set of the one or more software components that are active and a remainder of the one or more software components that are inactive;
      creating the associated second profile; and
      configuring the computing device based on the associated second profile, the configuring comprising:
         placing in the low power hardware state the remainder of the one or more hardware components; and
         placing in the low power software state the remainder of the one or more software components.

18. The one or more non-transitory computer readable media of claim 14, the operations further comprising:
   determining that no event is scheduled after the first event; and
   after determining that the first event has ended:

determining that the computing device is being used to perform an activity;

gathering hardware usage data identifying a first set of the one or more hardware components that are active and a remainder of the one or more hardware components that are inactive;

gathering software usage data identifying a second set of the one or more software components that are active and a remainder of the one or more software components that are inactive;

creating a new profile; and associating the new profile with the activity.

19. The one or more non-transitory computer readable media of claim 14, wherein the associated first profile comprises one of:

a home profile;

a work profile;

a driving profile;

a travelling profile; or a fitness profile.

20. The one or more non-transitory computer readable media of claim 14, the operations further comprising:

determining, based on the plurality of activities, a location where the battery can be charged during the particular time period; and adding a note, using the calendar application, into a particular event that occurs at the location, the note indicating to charge the computing device at the location.

\* \* \* \* \*